F. M. BEAVER.
AGRICULTURAL MACHINE.
APPLICATION FILED MAR. 20, 1915.
1,158,023.
Patented Oct. 26, 1915.
2 SHEETS—SHEET 1.
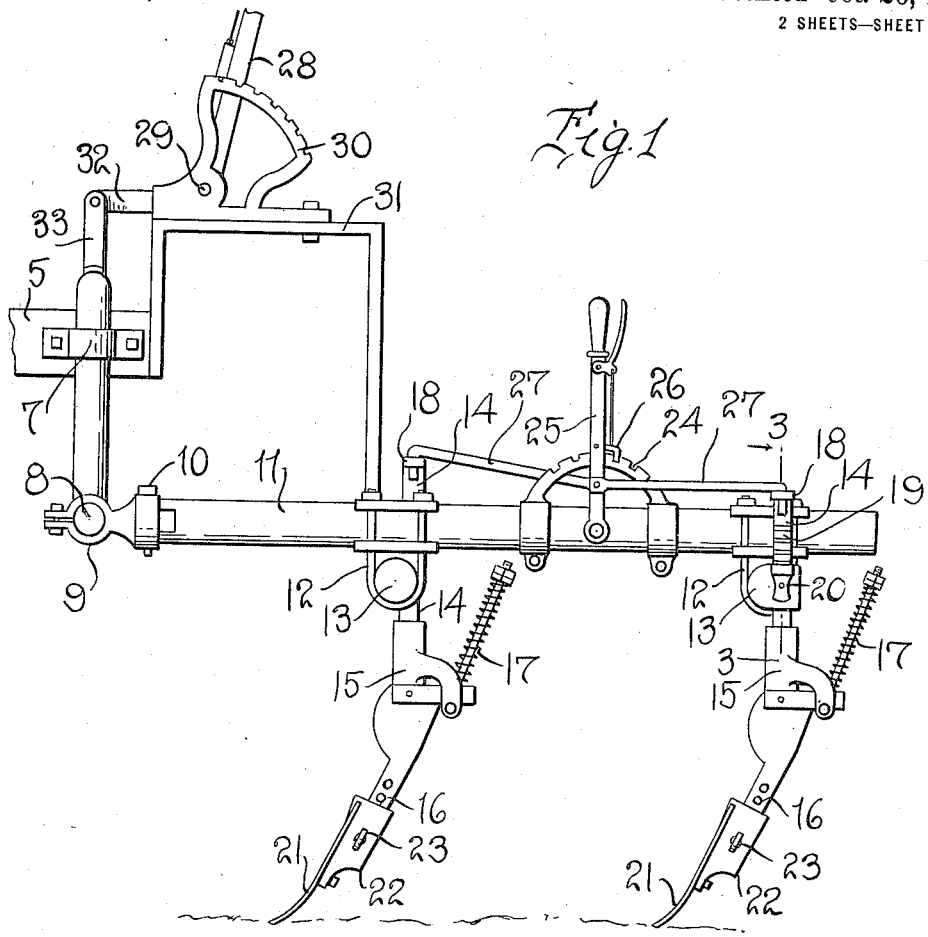
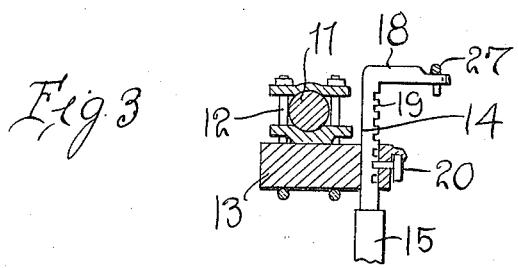
Witnesses
Inventor
F. M. BEAVER
By Watson E. Coleman
Attorney F. M. BEAVER.
AGRICULTURAL MACHINE.
APPLICATION FILED MAR. 20, 1915.
1,158,023.
Patented Oct. 26, 1915.
2 SHEETS—SHEET 2.
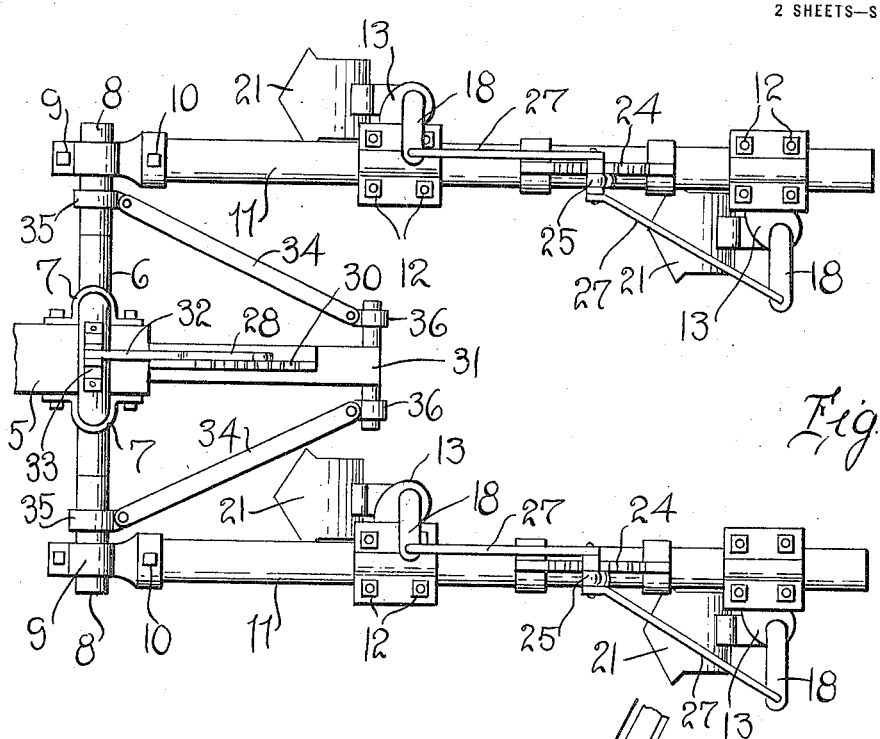
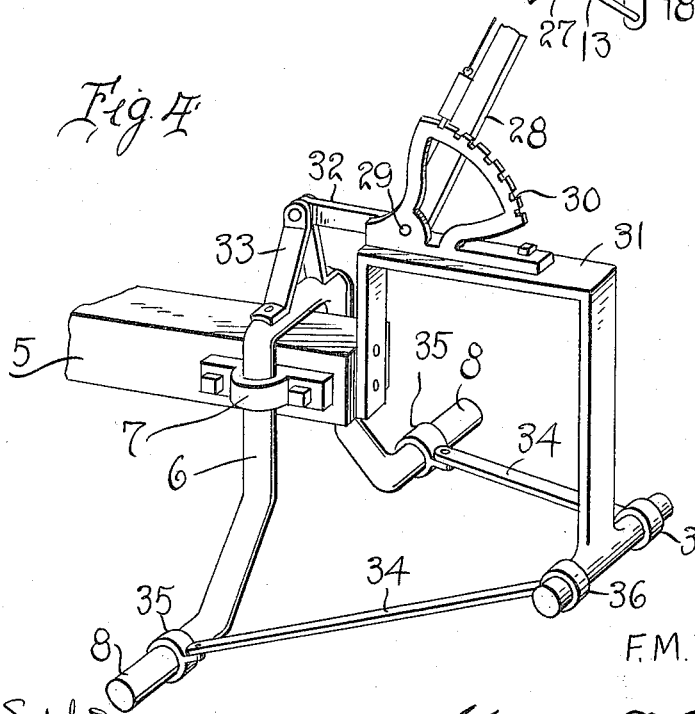
Witnesses
Robert M. Sutphen.
A. I. Hurd.
Inventor
F. M. Beaver
By Watson E. Coleman
Attorney

UNITED STATES PATENT OFFICE.

FRANCIS MARIAN BEAVER, OF CISCO, OKLAHOMA, ASSIGNOR OF ONE-HALF TO WILLIAM F. BOLIN, OF CISCO, OKLAHOMA.

AGRICULTURAL MACHINE.

1,158,023.  Specification of Letters Patent.  Patented Oct. 26, 1915.

Application filed March 20, 1915. Serial No. 15,914.

*To all whom it may concern:*

Be it known that I, FRANCIS MARIAN BEAVER, a citizen of the United States, residing at Cisco, in the county of McCurtain and State of Oklahoma, have invented certain new and useful Improvements in Agricultural Machines, of which the following is a specification, reference being had to the accompanying drawings.

This invention relates to an improved agricultural machine and more particularly to a plow or cultivator, the invention having for its primary object to provide improved means for adjusting the plow or cultivator blades whereby the depth of the furrow may be regulated.

The invention has for a more particular object to provide a plow of the above character including a beam, means for adjustably mounting the beam at one end upon the tongue of the machine or vehicle, a plurality of plows vertically adjustable upon the beam, and means for simultaneously adjusting said plows.

The invention has for a further general object to improve and simplify the construction of agricultural machines of the above character and render the same highly serviceable and convenient in practical use, strong and durable in construction, and capable of manufacture at comparatively small cost.

With the above and other objects in view, my invention consists in the novel features of construction, combination, and arrangement of parts to be hereinafter more fully described, claimed, and illustrated in the accompanying drawing, in which, Figure 1 is a side elevation of a plow constructed in accordance with the present invention; Fig. 2 is a top plan view; Fig. 3 is a section taken on the line 3—3 of Fig. 1; and Fig. 4 is a perspective view of a portion of the tongue, illustrating the means for adjusting the beam supporting axle thereon.

Referring in detail to the drawing, 5 designates the tongue of the machine, upon the end of which an axle is mounted. This axle is provided with an inverted V-shape body portion 6, the arms of which extend loosely through guide sleeves 7 secured to opposite sides of the tongue. The lower ends of these arms are laterally extended as shown at 8 to provide bearings for the collars 9 which are connected to the ends of longitudinally extending beams by pivot bolts 10.

Upon each of the beams 11, spaced pairs of vertically disposed U-shape bolts 12 are arranged, the bolts in each pair being disposed upon opposite sides of the beam and securely clamped thereto in any ordinary or approved manner. In each pair of the bolts 12 and below the beam 11, the transversely disposed guide members 13 are mounted and rotatably held in said bolts upon the beam by means of the clamping devices.

In one end of each of the guides 13, the vertically movable rods 14 are mounted, the lower end of each of said rods being provided with a foot piece 15 having an angularly disposed cylindrical arm 16. The foot pieces 15 are provided with the usual spring cushioning devices indicated at 17, which yieldingly hold the foot pieces and the plow blades thereon in their normal positions, but permit the plow blades to pass safely over boulders or other obstructions.

It will be noted that the rods 14 are disposed on relatively opposite sides of the beams 11 and the upper ends of these rods are angularly bent and transversely disposed with respect to the beam, in relatively opposite directions, as shown at 18. The outer side of each of the vertically extending rods 14 is provided with a series of notches 19 to receive a latch element 20 which is mounted upon the guide member 13. 21 designates the plow blades, each of which has a sleeve 22 secured upon its rear side to receive the angularly disposed arm 16 on one of the foot members. This sleeve carries a set screw 23 for binding engagement with said arm whereby the plow may be readily held in connection therewith.

Upon the beam 11 and between the plows mounted thereon, a rack 24 is secured. One end of a lever 25 is pivotally mounted upon the beam and carries the spring pressed dog 26 for engagement with the teeth of said rack. To the lever 25, the angularly disposed rods 27 are pivotally connected at one of their ends, the other ends of said rods being loosely connected to the extremities of the angularly disposed upper ends of the respective vertically adjustable rod 14.

It will be apparent, from the above description, that each of the plows may be independently adjusted vertically by simply releasing the latch member 20 from engagement with the notches 19 in the rod and shifting said rod vertically through the guide 13. The plow blades may also be disposed at any desired angle with respect to the line of movement of the machine, by simply manipulating the lever 25, said plows being simultaneously adjusted by the rotation of the rods 14 in the guides 13. The plow carrying beams 11 may also be adjusted bodily to vary the inclination of the plow blades with respect to the ground, by means of a lever indicated at 28 which is fulcrumed, as at 29, upon a rack 30 mounted upon the supporting bar 31 which is fixed to one end of the tongue 5. To this pivoted end of the lever, a longitudinally extending arm 32 is secured, and links 33 connect one end of this arm to the intermediate portion of the axle 6. Truss or brace rods 34 are connected to sleeve 35 loosely engaged upon the ends 8 of the axle, the other ends of said rods being similarly connected to the sleeves 36 on the free end of the supporting bar 31.

From the foregoing description, taken in connection with the accompanying drawing, it is believed that the construction, manner of operation, and several advantages of my invention, will be clearly and fully understood. The plow blades may be independently adjusted upon the beam to various angles and can also be moved vertically through the respective guides so that furrows of relatively different depths may be plowed. The construction and arrangement of the several parts employed is exceedingly simple and it will, therefore, be appreciated that the machine, as a whole, will be durable in practical use and highly serviceable and convenient. While I have shown, in the accompanying drawing, two plows mounted upon each beam, it is, of course, obvious that any desired number of the plows may be employed. The invention is also susceptible of various other modifications in the form, proportion, and arrangement of the several parts, and I, therefore, reserve the privilege of resorting to all such legitimate changes as may be fairly embodied within the spirit and scope of the invention as claimed.

Having thus fully described my invention, what I desire to claim and secure by Letters Patent is:—

1. The combination with a supporting tongue, of an arched axle vertically adjustable upon said tongue, cultivator beams connected to the opposite ends of said axle, a forwardly projecting substantially U-shaped bar fixed to the end of the beam, obliquely disposed braces connected to one extremity of said bar and to the ends of the axle, and means mounted upon said bar for raising and lowering the axle.

2. The combination with a supporting tongue, of an arched axle vertically movable upon said tongue, cultivator beams connected to the ends of said axle, a forwardly projecting inverted U-shaped bar fixed to the end of the tongue at one of its ends, the other end of said bar having cylindrical extensions formed thereon, sleeves loosely engaged upon the ends of the arched axle, sleeve loosely engaged upon the cylindrical extensions of said bar, obliquely disposed brace bars pivotally connected to the corresponding sleeves on the bar and axle, and means mounted upon the intermediate portion of the inverted U-shaped bar and connected to the medial portion of said axle to raise or lower the axle.

In testimony whereof I hereunto affix my signature in the presence of two witnesses.

FRANCIS MARIAN X BEAVER.
his mark

Witnesses:
J. D. LIGHTSEY,
C. R. O'NEAL.

Copies of this patent may be obtained for five cents each, by addressing the "Commissioner of Patents, Washington, D. C."